Feb. 26, 1946.  A. J. BRILLIANTINE  2,395,393
ELECTRIC ALIGNMENT MICROMETER
Filed June 3, 1944   3 Sheets-Sheet 2
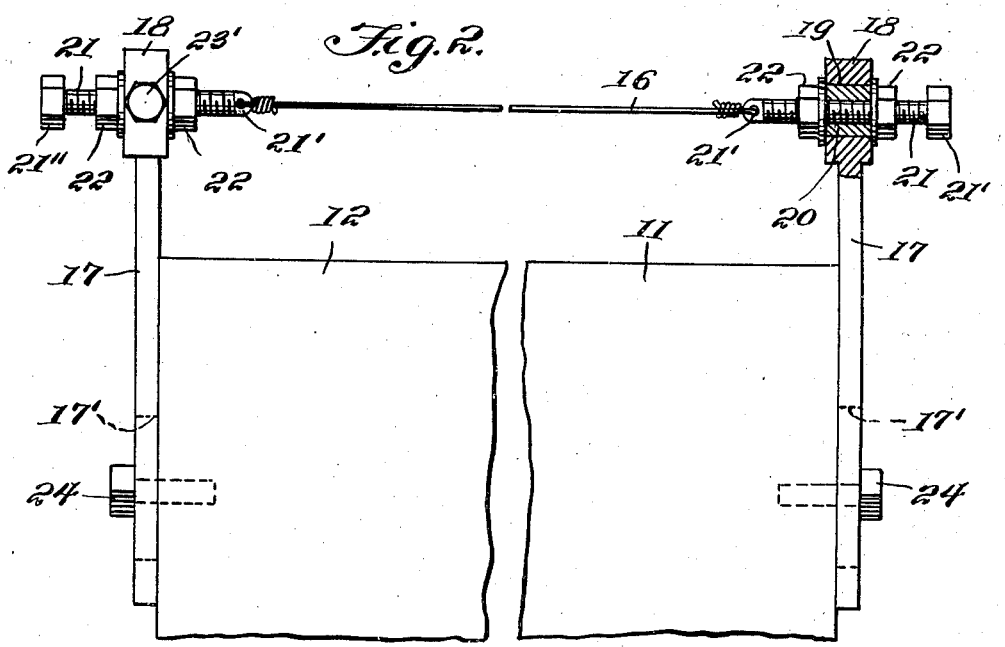
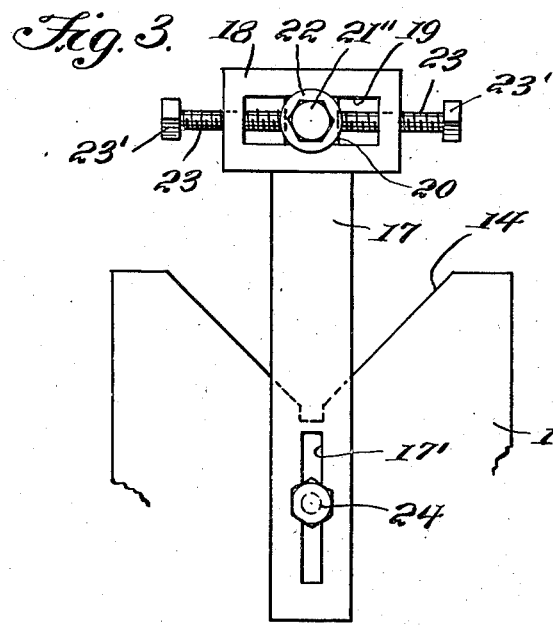
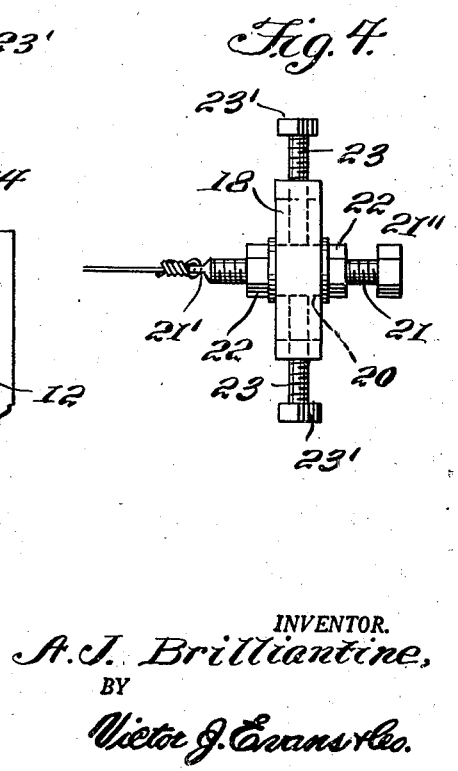
INVENTOR.
A. J. Brilliantine,
BY
Victor J. Evans & Co.
ATTORNEYS

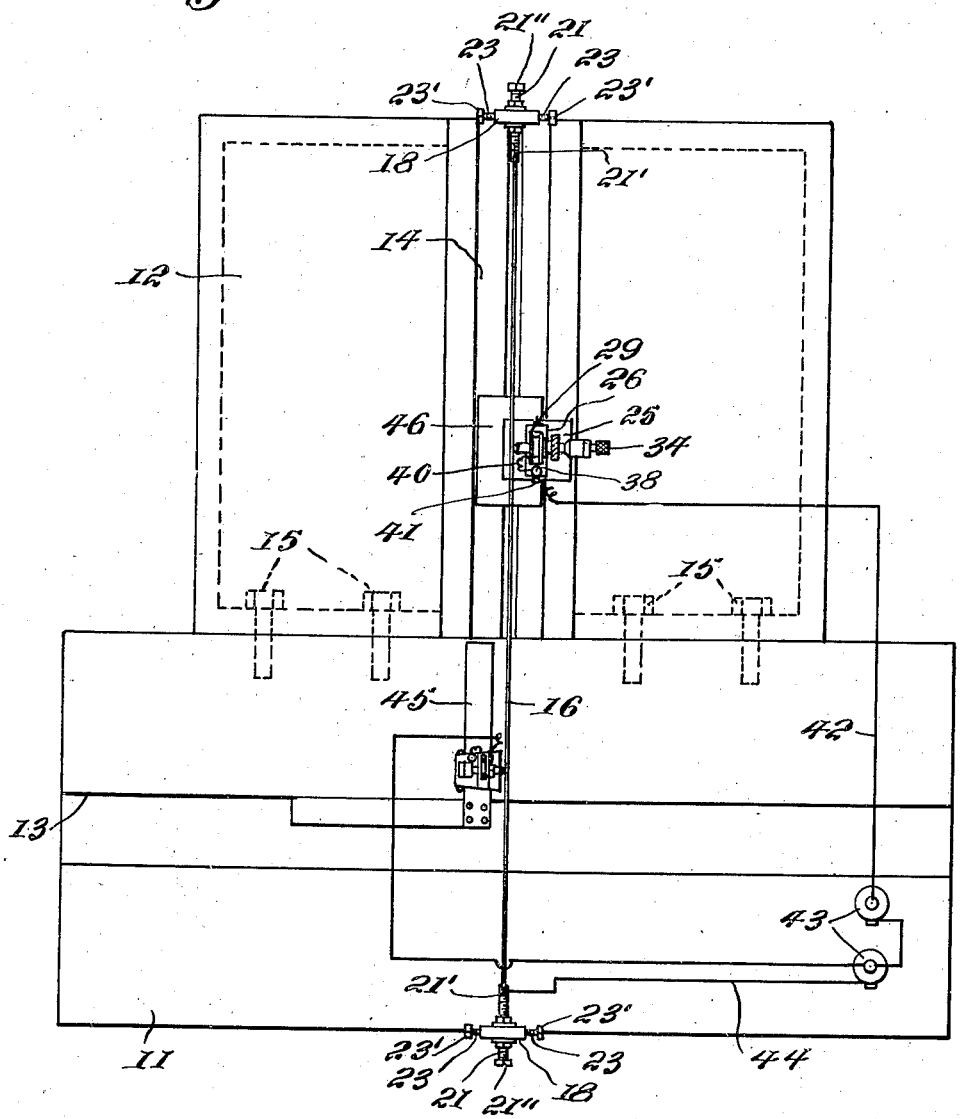

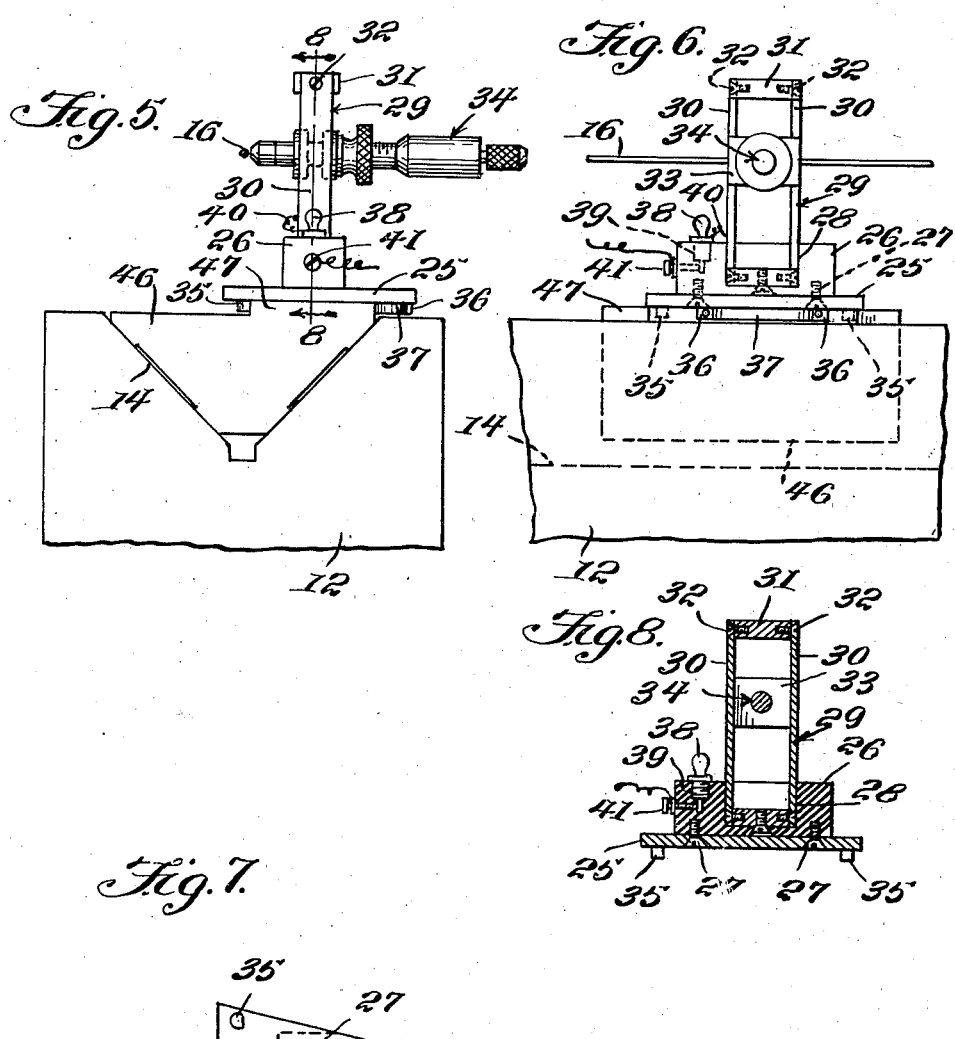

Patented Feb. 26, 1946

2,395,393

UNITED STATES PATENT OFFICE 2,395,393

ELECTRIC ALIGNMENT MICROMETER

Arche J. Brilliantine, Trenton, N. J.

Application June 3, 1944, Serial No. 538,637

4 Claims. (Cl. 33—84)

This invention relates to measuring instruments and more particularly to an instrument for accurately aligning bed plates, planar ways, grinders, horizontal boring mills, shafts and the like, and it is one object of the invention to provide an instrument of this character including a micrometer as an element thereof and an electric bulb which is in circuit with the micrometer and illuminated when contact is made with the object to be aligned and thus visually indicates when desired alignment has been attained.

Another object of the invention is to provide an alignment instrument wherein the carrier for the micrometer may be shifted longitudinally of the object and repeated tests made until all portions of the object are in proper alignment.

Another object of the invention is to provide an instrument wherein the micrometer is adapted for contact with a tightly stretched wire mounted longitudinally of the object to be aligned, contact of the micrometer with the wire closing a circuit and causing a bulb to be illuminated as a visible signal.

Another object of the invention is to so form a wire holder that the wire may be vertically adjusted and also shifted transversely when mounting the wire longitudinally of the object to be aligned.

Another object of the invention is to provide an instrument of this character which is simple in construction, easy to operate, and very easy to install for use.

The invention is illustrated in the accompanying drawings wherein:

Figure 1 is a top plan semi-diagrammatic view showing the instrument installed for use.

Figure 2 is a view showing the wire mounting principally in side elevation and partially in section.

Figure 3 is an end view of the wire mounting.

Figure 4 is a top plan view of a wire mounting.

Figure 5 is a view looking at one end of the micrometer and its mounting.

Figure 6 is a side view looking at the outer side of Figure 5.

Figure 7 is a bottom view of the micrometer mounting.

Figure 8 is a sectional view taken vertically along line 8—8 of Figure 5.

Referring to the drawings, wherein like characters of reference denote corresponding parts throughout the several views, the improved truing instrument, as it is exemplified therein, is herein described in its application for the aligning up of the ways in the bed plates of metal working planers and, for the purpose, two of the bed plates 11 and 12 are juxtapositioned, with the end of the bed plate 12 abutted against and centered with respect to a side of the plate 11, in which position, the bed plate 12 is secured, as by screws or the like 15, to the bed plate 11. By this arrangement, the way 13, of the bed plate 11, is disposed at right angles to the way 14, of the bed plate 12; it being understood that the faces of the bed plates lie in a common plane.

To determine whether or not the alignment, for instance, of the way 14, of the bed plate 12, is correct, a length of "piano" wire 16 is mounted above the bed plates, in tightly stretched state, parallel thereto and longitudinally of the way 14.

The mounting for each end of the wire 16 is comprised in a standard 17, having a cross-head 18 at its upper end, which is horizontally slotted, as at 19, to receive a slide block 20, that is transversely apertured for the threading therethrough of a screw 21. Flanged or winged nuts 22 are threaded on the screw 21, at opposite sides of the cross-head 18, and overlap the side faces of the cross-head, above and below the slide block 20, to secure the slide block in positions of adjustment along the slot length, as well as to lock the screw against accidental turning, when they are tightened against the cross-head faces. The inner end of the screw 21 is apertured, as at 21', for the securement therein of an end of the wire 16, while its outer end is headed, as at 21", for tool application thereto to facilitate the placing of the wire 16 under proper tension. The slide block 20 is positioned within the slot 19, between the opposed ends of the adjusting screws 23, that are threaded inwardly of the opposite ends of the cross-head 18, and these, also are headed, as at 23', for tool application to facilitate their manipulation. The standard 17 is to be mounted for vertical adjustment and, to that end, is longitudinally slotted, as at 17', for the engagement of a headed screw 24 with the slot. In the present instance, and as shown in Figures 1 through 3, one of the stretchers, as thus constituted, will be secured in place on the outer side of the bed plate 11 and another on the outer end of the bed plate 12, one in line with the other, so that the wire 16 will be stretched taut longitudinally of and in line with the way 14, of the bed plate 12.

The testing instrumentality, to be employed in conjunction with the stretched wire 16 for determining the correctness of the alignment of the way 14, of the bed plate 12, is comprised in a rigid base-plate 25, preferably of metal and substantially quadrilateral in plan, having a block of insulation 26 secured transversely of its top side, as by the screws 27. The block 26 is provided with a socket 28, at its center, to support an upright metal frame 29. This frame 29 is vertically elongated and is made up of parallel side pieces 30, secured at their ends to cross pieces 31, as by the screws 32. Spanning the opening in the frame and slidable on the front and rear edges of the side pieces 30, is a metal carrier 33 for a horizontally disposed micrometer 34, which is adjustable from the rear side of the frame.

In use, the micrometer testing device, as thus constructed, is to be slidably mounted on a straightedge and, to such end, the under side of the base-plate 25 is provided with pairs of transversely spaced lugs 35 and 36, the lugs 35 being located adjacent the front edge of the base-plate to overhang and bear against one side edge of the straight edge and the lugs 36 adjacent the rear edge of the base-plate for the securement thereto of the ends of an inwardly bowed spring 37, which overhangs and bears against the opposide side edge of the straight edge to frictionally resist free, or uncontrolled, movements of the base-plate relatively to the latter.

Cooperative with the testing device is a signal means preferably visual in character, and it consists in an electric lamp 38, which is mounted in a socket outlet 39, that is set flush in the upper side of the block of insulation 26, at one side of the frame 29. One terminal of the socket outlet 39 is connected, as at 40, to the frame and its other terminal direct to a binding post 41, secured in the adjacent end of the block 26. The terminal post 41 is connected, by a conductor 42, to the positive side of a current source 43, the other, negative, side of which is connected, by a conductor 44, to the wire 16, adjacent its point of connection with one of the adjusting screws 21.

In making an alignment test of the way 14, of the bed-plate 12, and after the wire 16 has been stretched between the standards 17 and the electrical connections established with the current source 43, as before stated, the micrometer device is mounted on a straightedge, e. g., the blade of a square 45, which blade is positioned at one side of and parallel to the wire 16, with the other blade aligned with the inner side of the way 13, of the bed-plate 11. Here, the device will be moved to one end of the blade on which it is mounted and the micrometer carrier 33 adjusted in the frame 29 to align the spindle of the micrometer 34 with the wire 16. The micrometer 34 is now adjusted to move its spindle into contact with the wire 16, when the signal lamp 38 will be energized and a reading taken from the micrometer scale. From this initial setting of the device, it will be shifted along the blade length to its opposite end and, if the wire 16 is parallel to the blade, the lamp 38 will remain lighted. However, if the lamp 38 becomes de-energized, the micrometer 34 will again be adjusted to place the end of its spindle in contact with the wire 16 and a new reading taken, upon the lighting up of the signal lamp. Thus, if the first reading was .001 and the second reading .010, the wire 16 will be .010 out of parallel and will thereafter be shifted until it is brought into absolute parallelism with respect to the blade of the square 45; the shifting of the wire being readily accomplished by the manipulation of the adjusting screws 23 to move the slide block 20 in a slot 19, of one or the other, or both, of the cross-heads 18.

With the wire 16 thus accurately aligned with the blade of the square 45, the micrometer device will be removed from the blade and transferred to an adapter 46, which is slidably fitted in the way 14, of the bed-plate 12. This adapter 46 is of elongated form and is provided with a longitudinal shoulder 47 on its top side for the sliding support of the base-plate 25, of the micrometer device, thereon; the lugs 35 on the latter engaging the offside edge of the shoulder and the spring 37 the near side edge thereof. With the carrier 33 adjusted in the frame 29 to position the micrometer 34 in line with the wire 16, the micrometer will be adjusted to move the end of its spindle into contact with the wire, when the signal lamp 38 will be energized, by the closing of the circuit through the micrometer and the wire on the current source 43. With this setting of the micrometer 34, and if the way 14 is in perfect alignment with the wire 16, the lamp 38 will remain lighted throughout a shifting of the device along the shoulder 47, of the adapter 46, and the latter along the way 14. If there is any deflection between the wire 16 and the contacting end of the micrometer spindle, the non-alignment of the way 14 will be indicated by the lamp 38 becoming de-energized and the amount of such deflection can then be determined by an adjustment of the micrometer 34 to again move its spindle into contact with the wire 16 and taking the reading from the micrometer scale. If the way 14 is found to be out of line, it is to be corrected by scraping the sides of the way, or shifting the bed-plate 12, until the desired perfect alignment is obtained.

In the use of piano wire, the end of the micrometer spindle will be tipped with Monel metal, and, in lieu of the piano wire, a wire of a non-magnetic character, such as bronze, Monel or the like, may be substituted in which case, the end of the spindle will preferably be tipped with copper, for more efficient electrical contact.

From the foregoing, it will be obvious that the invention has the advantage of greater speed and accuracy in the performance of operations of this kind, than any of the methods and devices heretofore employed for like purposes, reducing the time required to complete a job from two or more days to but one or more hours of actual working time.

Having thus fully described my invention, it is to be understood that any changes in design or in minor details of construction and arrangements of parts to which the invention is susceptible may be resorted to, without departing from the spirit of the same or its scope as claimed.

Having thus described the invention, what is claimed is:

1. In combination with a machine element having a channel therein and a bed plate companion to the machine element mounted in abutting engagement with the machine element and formed with a channel extending transversely of the channel in the machine element, a wire for extending longitudinally of the channel in the machine element, mounting posts for said wire, one post being carried by the machine element at an end of its channel and the other being carried by said bed plate, a cross head at the upper end of each post formed with a transverse slot, a block in each slot shiftable longitudinally therein to adjusted positions, a screw passing through each block, said wire having its ends connected to said screws and held tightly stretched by the screws, a block resting in the channel of the machine element and shiftable longitudinally therein, a carriage upon said block, a micrometer carried by said carriage and adjustable transversely of the wire for contacting engagement therewith, a signal lamp in circuit with the micrometer, a square resting upon said bed plate with one arm extending longitudinally on its channel and its other arm extending transversely from the first arm in longitudinal alignment with the channel of the machine element, a carriage upon the second arm of said square longitudinally thereof, a micrometer and a signal lamp carried by the second carriage in circuit with each other, a source of electric energy, and conductor wires connecting the source of energy with the micrometers and with the screw of one post.

2. The invention as described in claim 1 wherein the base of said carriages are formed with lugs adjacent one side edge thereof, and a spring on the underside thereof for engaging said block and said square and frictionally holding said carriages thereon.

3. The invention as described in claim 1 wherein the block is formed of insulating material and said micrometers are carried by an upright frame on said block.

4. The invention as described in claim 1 wherein said micrometers are carried by upright frames comprising side bars and upper and lower cross bars between the side bars, a bridging strip extending between the side bars intermediate the height of the frame to support the micrometers.

ARCHE J. BRILLIANTINE.